United States Patent
Zhuo et al.

(10) Patent No.: US 12,253,835 B2
(45) Date of Patent: Mar. 18, 2025

(54) LEARNING PROCESSING APPARATUS, CONTROL APPARATUS, LEARNING PROCESSING METHOD, CONTROL METHOD, NON-TRANSITORY COMPUTER-READABLE MEDIUM HAVING LEARNING PROGRAM RECORDED THEREON, AND NON-TRANSITORY COMPUTER-READABLE MEDIUM HAVING CONTROL PROGRAM RECORDED THEREON

(71) Applicant: Yokogawa Electric Corporation, Tokyo (JP)

(72) Inventors: Liu Zhuo, Tokyo (JP); Hiroaki Kanokogi, Tokyo (JP); Go Takami, Tokyo (JP); Yota Furukawa, Tokyo (JP); Hirotsugu Gotou, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 336 days.

(21) Appl. No.: 17/688,794

(22) Filed: Mar. 7, 2022

(65) Prior Publication Data
US 2022/0317636 A1 Oct. 6, 2022

(30) Foreign Application Priority Data
Mar. 31, 2021 (JP) .................... 2021-060666

(51) Int. Cl.
*G05B 13/02* (2006.01)
*G05B 13/04* (2006.01)

(52) U.S. Cl.
CPC ....... *G05B 13/0265* (2013.01); *G05B 13/041* (2013.01)

(58) Field of Classification Search
CPC .................... G05B 13/0265; G05B 13/041
(Continued)

(56) References Cited

U.S. PATENT DOCUMENTS

| 5,414,619 A | 5/1995 | Katayama |
| 2004/0117040 A1* | 6/2004 | Sayyarrodsari ...... G05B 13/048 700/29 |

(Continued)

FOREIGN PATENT DOCUMENTS

| EP | 0710901 A1 | 5/1996 |
| EP | 3376311 A1 | 9/2018 |

(Continued)

OTHER PUBLICATIONS

Butler (NPL: Development of Techniques for Real-Time Monitoring and Control in Plasma Etching: II . Multivariable Control System Analysis of Manipulated, Measured, and Performance Variables, Journal of The Electrochemical Society, S. W. Butler et al 1991 J. Electrochem. Soc. 138 2727) (Year: 1991).*

(Continued)

*Primary Examiner* — Jigneshkumar C Patel

(57) ABSTRACT

There is provided a learning processing apparatus comprising: a learning processing unit configured to generate a control model that outputs a manipulated variable corresponding to an indicated variable and a process variable of a predetermined system by means of machine learning; a generation unit configured to generate controlling data that indicates a correspondence relation of a combination of the indicated variable and the process variable to the manipulated variable corresponding to the combination by using the control model; and a supply unit configured to supply the controlling data to a predetermined control apparatus.

16 Claims, 12 Drawing Sheets

(58) Field of Classification Search
USPC .......................................................... 700/33
See application file for complete search history.

(56) References Cited

U.S. PATENT DOCUMENTS

| | | | |
|---|---|---|---|
| 2006/0064181 A1* | 3/2006 | Kato | G05B 13/042 |
| | | | 700/28 |
| 2007/0142975 A1* | 6/2007 | Piche | H02J 3/38 |
| | | | 700/286 |
| 2010/0222911 A1* | 9/2010 | Castelijns | G05B 13/048 |
| | | | 700/282 |
| 2018/0262145 A1* | 9/2018 | Saito | H02P 23/14 |
| 2020/0183342 A1 | 6/2020 | Du | |
| 2021/0115834 A1 | 4/2021 | Hashimoto | |
| 2021/0129405 A1 | 5/2021 | Yamada | |
| 2021/0271212 A1* | 9/2021 | Wojsznis | G05B 13/041 |

FOREIGN PATENT DOCUMENTS

| | | |
|---|---|---|
| EP | 3620868 A1 | 3/2020 |
| JP | 2019130771 A | 8/2019 |
| JP | 2021067191 A | 4/2021 |
| JP | 2021117699 A * | 8/2021 |

OTHER PUBLICATIONS

Office Action issued for counterpart Japanese Application No. 2021-060666, issued by the Japanese Patent Office on Feb. 7, 2023 (drafted on Jan. 31, 2023).

Office Action issued for counterpart European Application No. 22163600.4, issued by the European Patent Office on Jun. 20, 2023.

Office Action issued for counterpart Japanese Application No. 2021-060666, issued by the Japanese Patent Office on Jul. 4, 2023 (drafted on Jun. 27, 2023).

Extended European Search Report for counterpart European Application No. 22163600.4, issued by the European Patent Office on Aug. 8, 2022.

Extended European Search Report for counterpart European Application No. 24177209.4, issued by the European Patent Office on Sep. 10, 2024.

* cited by examiner

LEARNING PROCESSING APPARATUS, CONTROL APPARATUS, LEARNING PROCESSING METHOD, CONTROL METHOD, NON-TRANSITORY COMPUTER-READABLE MEDIUM HAVING LEARNING PROGRAM RECORDED THEREON, AND NON-TRANSITORY COMPUTER-READABLE MEDIUM HAVING CONTROL PROGRAM RECORDED THEREON

The contents of the following Japanese patent application(s) are incorporated herein by reference:
NO. 2021-060666 filed in JP on Mar. 31, 2021.

BACKGROUND

1. Technical Field

The present invention relates to a learning processing apparatus, a control apparatus, a learning processing method, a control method, a non-transitory computer-readable medium having a learning program recorded thereon, and a non-transitory computer-readable medium having a control program recorded thereon.

2. Related Art

Patent Document 1 describes "the temperature control device performing PID control of a cylinder temperature using temperature control information."

PRIOR ART DOCUMENT

Patent Documents

Patent Document 1: Japanese patent application publication No. 2019-130771

SUMMARY

A first aspect of the present invention provides a learning processing apparatus. The learning processing apparatus may comprise a learning processing unit configured to generate a control model that outputs a manipulated variable corresponding to an indicated variable and a process variable of a predetermined system by means of machine learning. The learning processing apparatus may comprise a generation unit configured to generate controlling data that indicates a correspondence relation of a combination of the indicated variable and the process variable to the manipulated variable corresponding to that combination by using the control model. The learning processing apparatus may comprise a supply unit configured to supply the controlling data to a predetermined control apparatus.

The manipulated variable may be a maximum manipulated variable or a minimum manipulated variable within a predetermined manipulable range.

The control model may output the manipulated variable so that the process variable is a set-up setting value. The generation unit may generate different controlling data for each setting value.

The control model may be generated corresponding to a predetermined plurality of systems. The generation unit may generate different controlling data for each of the plurality of systems.

The controlling data may include a map of manipulated variables to which the correspondence relation of the combination of the indicated variable and the process variable to the manipulated variable corresponding to that combination is mapped.

A second aspect of the present invention provides a control apparatus. The control apparatus may comprise an input data acquisition unit configured to acquire the indicated variable and the process variable of the predetermined system. The control apparatus may comprise a controlling data acquisition unit configured to acquire the controlling data that is generated using the control model which has been made to learn to output the manipulated variable corresponding to the indicated variable and the process variable and that indicates the correspondence relation of the combination of the indicated variable and the process variable to the manipulated variable which is output corresponding to that combination. The control apparatus may comprise a calculation unit configured to calculate the manipulated variable corresponding to the combination of the indicated variable and the process variable by using the controlling data. The control apparatus may comprise an output unit configured to output the manipulated variable to a predetermined controlled object.

The controlling data acquisition unit may acquire the plurality of maps of manipulated variables, as the controlling data, to which the correspondence relation of the combination of the indicated variable and the process variable to the manipulated variable corresponding to that combination is mapped. The input data acquisition unit may acquire feature data relating to the system. The control apparatus may comprise a map selection unit configured to select an arbitrary map of manipulated variables from the plurality of maps of manipulated variables based on the feature data.

The control apparatus may comprise a scaling unit configured to scale the indicated variable and the process variable to values depending on the map of manipulated variables. The control apparatus may comprise a reverse scaling unit configured to reverse-scale the manipulated variable calculated from the map of manipulated variables depending on the system.

The output unit may output the maximum manipulated variable or the minimum manipulated variable within the predetermined manipulable range as the manipulated variable to the controlled object.

A third aspect of the present invention provides a learning processing method. The learning processing method may comprise generating the control model that outputs the manipulated variable corresponding to the indicated variable and the process variable of the predetermined system by means of machine learning. The learning processing method may comprise generating the controlling data that indicates the correspondence relation of the combination of the indicated variable and the process variable to the manipulated variable corresponding to that combination by using the control model. The learning processing method may comprise supplying the controlling data to the predetermined control apparatus.

A fourth aspect of the present invention provides a control method. The control method may comprise acquiring the indicated variable and the process variable of the predetermined system. The control method may comprise acquiring the controlling data that is generated using the control model which has been made to learn to output the manipulated variable corresponding to the indicated variable and the process variable and that indicates the correspondence relation of the combination of the indicated variable and the process variable to the manipulated variable which is output corresponding to that combination. The control method may comprise calculating the manipulated variable corresponding to the combination of the indicated variable and the process variable by using the controlling data. The control method may comprise outputting the manipulated variable to the predetermined controlled object.

A fifth aspect of the present invention provides a non-transitory computer-readable medium having recorded thereon a learning program. The learning program may be executed by a computer to cause the computer to function as the learning processing unit configured to generate the control model that outputs the manipulated variable corresponding to the indicated variable and the process variable of the predetermined system by means of machine learning. The learning program may be executed by the computer to cause the computer to function as the generation unit configured to generate the controlling data that indicates the correspondence relation of the combination of the indicated variable and the process variable to the manipulated variable corresponding to that combination by using the control model. The learning program may be executed by the computer to cause the computer to function as the supply unit configured to supply the controlling data to the predetermined control apparatus.

A sixth aspect of the present invention provides a non-transitory computer-readable medium having recorded thereon a control program. The control program may be executed by the computer to cause the computer to function as the input data acquisition unit configured to acquire the indicated variable and the process variable of the predetermined system. The control program may be executed by the computer to cause the computer to function as the controlling data acquisition unit configured to acquire the controlling data that is generated using the control model which has been made to learn to output the manipulated variable corresponding to the indicated variable and the process variable and that indicates the correspondence relation of the combination of the indicated variable and the process variable to the manipulated variable which is output corresponding to that combination. The control program may be executed by the computer to cause the computer to function as the calculation unit configured to calculate the manipulated variable corresponding to the combination of the indicated variable and the process variable by using the controlling data. The control program may be executed by the computer to cause the computer to function as the output unit configured to output the manipulated variable to the predetermined controlled object.

Note that the summary clause above does not recite all necessary features of the present invention. In addition, a sub-combination of a group of these features may also constitute the present invention.

DESCRIPTION OF EXEMPLARY EMBODIMENTS

While the present invention will be described below by means of embodiments of the invention, these embodiments below are not intended to limit the invention defined by the claims. In addition, all combinations of features set forth in the embodiments are not necessarily essential to the solutions of the present invention.

Figure 1A:
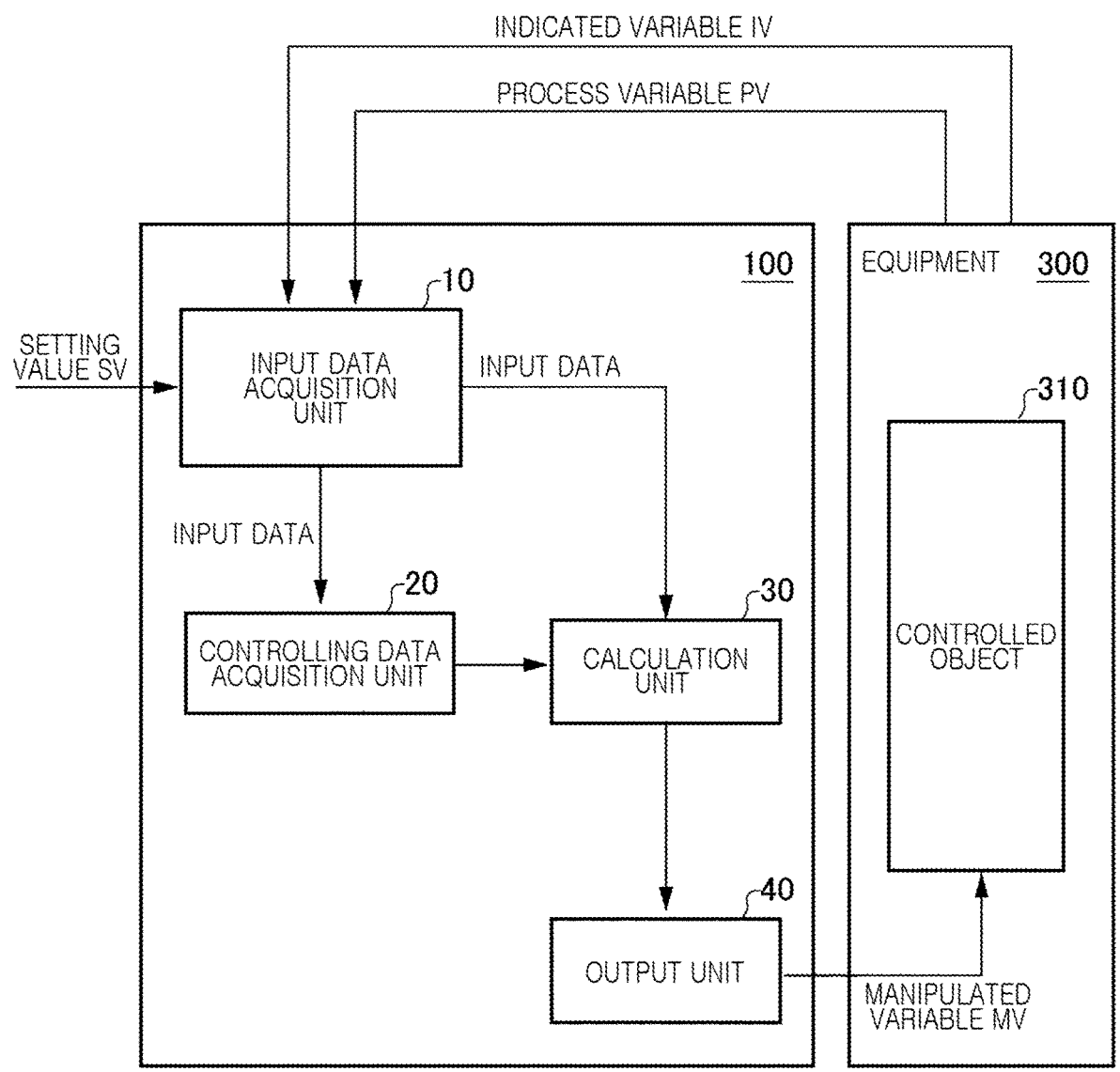
FIG. 1A illustrates a schematic configuration of a control apparatus 100 along with equipment 300.

FIG. 1A illustrates a schematic configuration of a control apparatus 100 along with equipment 300. The control apparatus 100 controls operations of a controlled object 310 provided in the equipment 300.

The equipment 300 is a facility, an apparatus or the like in which the controlled object 310 is installed. For example, the equipment 300 may be a plant, or may be a combined apparatus in which a plurality of devices are combined. Plants include industrial plants such as chemical or bio-engineering plants, plants for managing/controlling such as gas or oil wellheads and surroundings, plants for managing/controlling such as hydroelectric, thermal, or nuclear power generation, plants for managing/controlling such as solar or wind energy environmental power generation, and plants for managing/controlling such as waterworks or dams, for example.

The equipment 300 is provided with the controlled object 310. Although this figure shows the case, as an example, in which the equipment 300 is provided with only one controlled object 310, the case is not limited thereto. The equipment 300 may be provided with a plurality of controlled objects 310.

Moreover, the equipment 300 may be provided with one or more sensors (not shown) for measuring various states (physical quantities) inside and outside the equipment 300. Such sensors acquire operational data that indicates an operational state as a result of controlling the controlled object 310, for example. For example, the operational data may indicate a process variable PV (Process Variable) that is measured for the controlled object 310: as an example, it may indicate an output (controlled variable) of the controlled object 310 or may indicate various values that change depending on the output of the controlled object 310.

The controlled object 310 is a field device and apparatus, for example, serving as a target of control. For example, the controlled object 310 is: a sensor device such as a pressure gauge, a flowmeter, and a temperature sensor; a valve device such as a flow control valve and a switching valve; or an actuator device such as a fan and a motor.

The control apparatus 100 of the present example performs process control by a single-input and single-output with one process variable PV and one manipulated variable MV. For example, the control apparatus 100 performs the process control such as temperature adjustment, liquid level regulation, flow rate regulation, or the like.

The control apparatus 100 may be a computer such as a PC (personal computer), a tablet computer, a smartphone, a workstation, a server computer, or a general-purpose computer, and may be a computer system in which a plurality of computers are connected. Such a computer system is also a computer in a broad sense. Moreover, the control apparatus 100 may be implemented by a virtual computer environment which is singly or plurally executable in the computer. Alternatively, the control apparatus 100 may be a dedicated computer designed for AI control or may be dedicated hardware realized by a dedicated circuit. Moreover, when the control apparatus 100 can be connected to the Internet, the control apparatus 100 may be realized by cloud computing.

The control apparatus 100 comprises an input data acquisition unit 10, a controlling data acquisition unit 20, a calculation unit 30, and an output unit 40. Note that these blocks are functional blocks each separated functionally and they do not necessarily match those in an actual device configuration. Thus, even when any unit is shown as one block in this figure, it is not limited to that configured by one device. Moreover, even when any units are shown as separate blocks in this figure, they are not limited to those configured by separate devices.

The input data acquisition unit 10 acquires predetermined input data. For example, the input data acquisition unit 10 acquires an indicated variable IV and a process variable PV of a predetermined system, as the input data, from the equipment 300. The indicated variable IV and the process variable PV may be measured by a sensor provided in the equipment 300 and transmitted to the input data acquisition unit 10 via a network. Moreover, the input data acquisition unit 10 acquires a setting value SV which has been set up by an operator or the like, as the input data. The input data acquisition unit 10 may supply the acquired input data to the controlling data acquisition unit 20 and the calculation unit 30.

The controlling data acquisition unit 20 acquires controlling data that indicates a correspondence relation of a combination of the indicated variable IV and the process variable PV to a manipulated variable MV (Manipulated Variable) which is output corresponding to that combination. The controlling data acquisition unit 20 may have a storing unit for storing the acquired controlling data. The controlling data is generated using a control model which has been made to learn to output the manipulated variable MV corresponding to the indicated variable IV and the process variable PV.

The controlling data is not particularly limited as to its data format as long as it indicates the correspondence relation of the combination of the indicated variable IV and the process variable PV to the manipulated variable MV. In an example, the controlling data includes a map of manipulated variables to which the correspondence relation of the combination of the indicated variable IV and the process variable PV to the manipulated variable MV is mapped. The map of manipulated variables will be described below. The controlling data may indicate the correspondence relation of the combination of the indicated variable IV and the process variable PV to the manipulated variable MV in a table format.

The calculation unit 30 calculates the manipulated variable MV corresponding to the combination of the indicated variable IV and the process variable PV by using the controlling data. In an example, the calculation unit 30 calculates a maximum manipulated variable MV or a minimum manipulated variable MV within a predetermined manipulable range, as the manipulated variable MV. The maximum manipulated variable MV may be a maximum value of a positive manipulated variable MV within the predetermined manipulable range. The minimum manipulated variable MV may be a minimum value of a negative manipulated variable MV within the predetermined manipulable range.

Moreover, the calculation unit 30 may calculate the manipulated variable MV based on the setting value SV as well. For example, the calculation unit 30 selects the map of manipulated variables based on the setting value SV to calculate the manipulated variable MV using the selected map of manipulated variables. Note that the calculation unit 30 may switch to other control methods such as PID control when a difference between the setting value SV and the process variable PV becomes smaller than a predetermined value.

The output unit 40 outputs the manipulated variable MV calculated by the calculation unit 30 to the controlled object 310. The output unit 40 may output the maximum manipulated variable MV or the minimum manipulated variable MV within the predetermined manipulable range, as the manipulated variable MV, to the controlled object.

For example, when the control apparatus 100 regulates rotational speed for performing opening/closing of a valve, thereby controlling a water level in a tank, the indicated variable IV is an opening degree of the valve, the process variable PV is the water level in the tank, and the manipulated variable MV is the rotational speed of the valve. Moreover, when the control apparatus 100 regulates current flowing in a heating wire to control temperature in a furnace, the indicated variable IV is temperature of the heating wire itself, the process variable PV is temperature of the entire furnace, and the manipulated variable MV may be current to the heating wire.

The control apparatus 100 of the present example calculates the manipulated variable MV using the controlling data generated by machine learning, thereby enabling realization of the control with less overshoot and higher speed as compared to other controls such as the PID control. The control apparatus 100 of the present example is used as a single-loop controller and outputs the maximum manipulated variable MV or the minimum manipulated variable MV to the controlled object, thereby enabling realization of the control with the theoretically highest speed. Whereby, the control apparatus 100 can reduce time to regulate the water level in the tank, rising time of furnace temperature, or the like, as compared to the case with the PID control. In addition, a system can be realized which supports increase in production resulting from the shortened rising time, saving of energy to be used upon initial startup, or quick multi-kind batch production. Moreover, reduction in overshoot can realize decrease in waste resulting from early stabilization of quality, improvement in an equipment operation rate, or prolonged service life resulting from decrease in equipment burden.

Figure 1B:
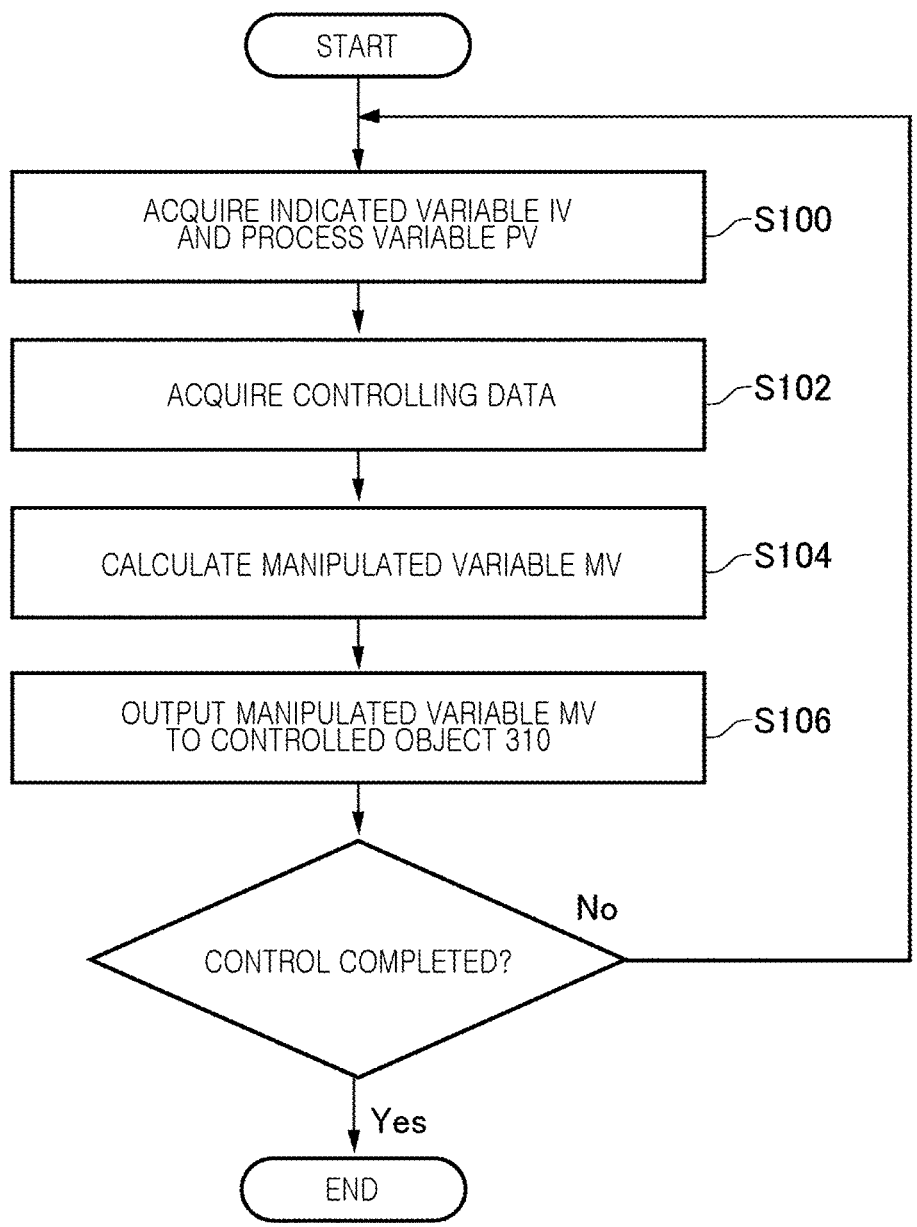
FIG. 1B illustrates an exemplary flow for the control apparatus 100 to control operations of a controlled object 310.

FIG. 1B illustrates an exemplary flow for the control apparatus 100 to control operations of the controlled object 310. At Step S100, the control apparatus 100 acquires the indicated variable W and the process variable PV. Moreover, at Step S100, the control apparatus 100 may acquire the setting value SV or may have acquired the setting value SV in advance. For example, the control apparatus 100 acquires the setting value SV which is set up in advance by the operator, and acquires the indicated variable IV and the process variable PV in real time from the sensor of the equipment 300.

At Step S102, the control apparatus 100 acquires the controlling data. The control apparatus 100 may have acquired the controlling data generated by machine learning in advance or may acquire the controlling data which is machine-learned using a simulator or an actual system.

At Step S104, the control apparatus 100 calculates the manipulated variable MV based on the controlling data. At Step S106, the manipulated variable MV is output to the controlled object 310. Thereafter, the control apparatus 100 determines whether the control is terminated. If the control is not terminated, the control apparatus 100 returns to Step S100 to acquire the indicated variable IV and the process variable PV.

For example, the control apparatus 100 may use control using the controlling data generated by machine learning in combination with feedback control. The feedback control may be at least one of proportional control (P control), integral control (I control), or derivative control (D control), and may be the PID control in an example. As an example, in the feedback control, the manipulated variable MV is calculated based on the process variable PV and the setting value SV. In the feedback control, the manipulated variable MV may be calculated in response to the setting value SV being set up so as to reduce a difference between that setting value SV and the current process variable PV.

Figure 2A:
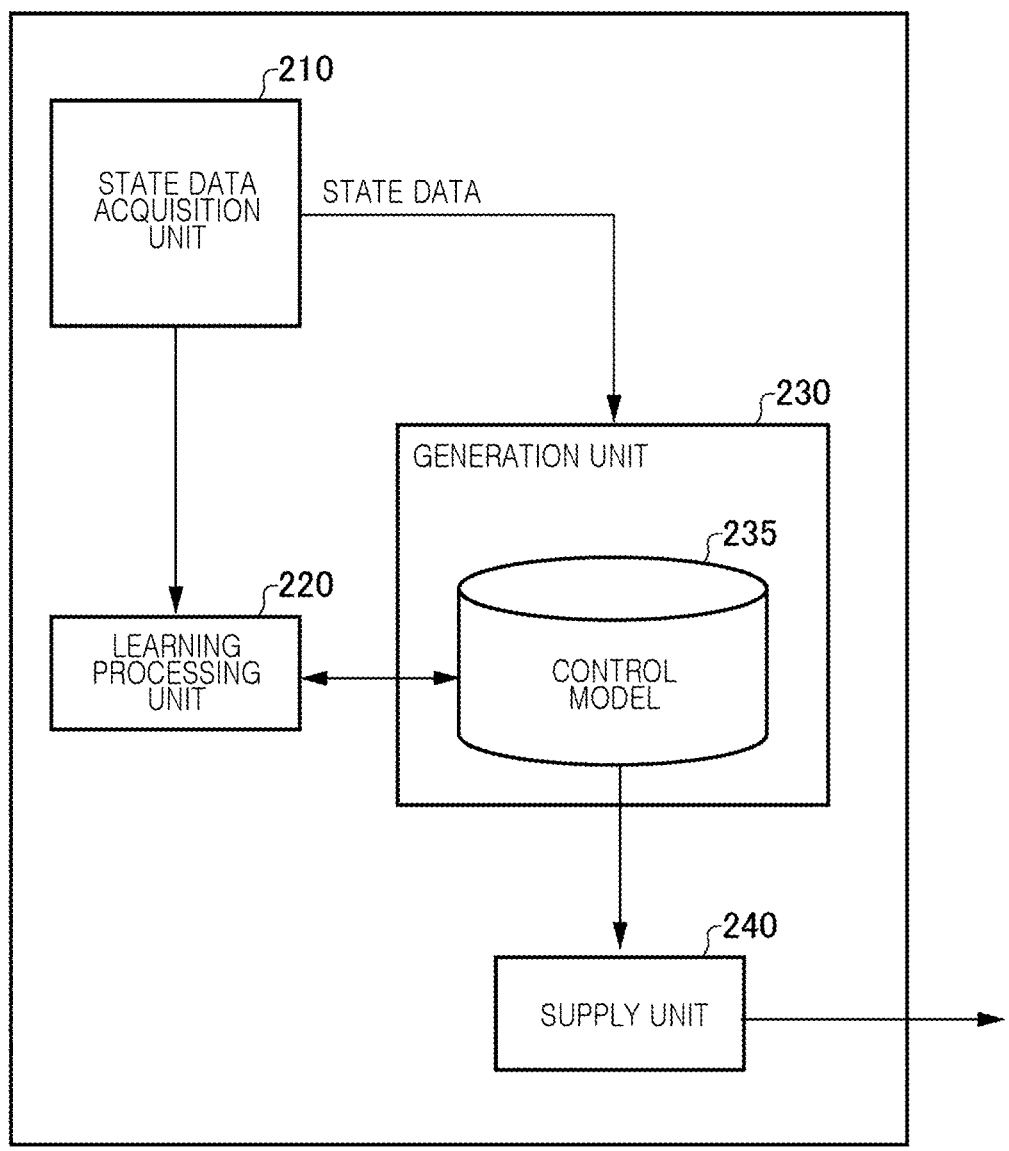
FIG. 2A illustrates a schematic configuration of a learning processing apparatus 200.

FIG. 2A illustrates a schematic configuration of a learning processing apparatus 200. The learning processing apparatus 200 comprises a state data acquisition unit 210, a learning processing unit 220, a generation unit 230, and a supply unit 240.

The state data acquisition unit 210 acquires state data that indicates a state of the equipment 300 provided with the controlled object 310. For example, the state data acquisition unit 210 acquires the indicated variable IV and the process variable PV measured by the sensor provided in the equipment 300. The state data acquisition unit 210 may supply the acquired state data to the learning processing unit 220 and the generation unit 230.

The learning processing unit 220 generates a control model 235 that outputs the manipulated variable MV corresponding to the indicated variable IV and the process variable PV by means of machine learning. In the present example, input values of the control model 235 are the indicated variable IV and the process variable PV, while an output value is the manipulated variable MV. When the process variable PV corresponding to the indicated variable IV is obtained, the learning processing unit 220 generates the control model 235, by means of machine learning, that outputs the manipulated variable MV which converges to the setting value SV with less overshoot and the highest speed. The control model 235 may be generated corresponding to a predetermined plurality of systems. For example, the control model 235 is generated by performing the machine learning on each system such as a system to control temperature in a heating furnace or a system to control a water level in a tank.

The control model 235 is a learning model generated by the learning processing unit 220 by means of reinforcement learning, which outputs the manipulated variable MV corresponding to a state of the equipment 300. The control model 235 of the present example outputs the manipulated variable MV so that the process variable PV becomes the predetermined setting value SV. Note that, although this figure shows the case, as an example, in which the control model 235 is built in the learning processing apparatus 200, the case is not limited thereto. The control model 235 may be stored in the control apparatus 100. Note that the control model 235 may be a model which outputs the manipulated variable MV for each setting value SV. The control model 235 may include a plurality of models which are reinforcement-learned for each setting value SV. For example, the control model 235 is each model which outputs the manipulated variable MV when the setting value SV is a first value (e.g., 5) or which outputs the manipulated variable MV when the setting value SV is a second value (e.g., 10).

The generation unit 230 generates the controlling data that indicates the correspondence relation of the combination of the indicated variable IV and the process variable PV to the manipulated variable MV corresponding to that combination by using the control model 235. The generation unit 230 may generate different controlling data for each setting value SV. The generation unit 230 of the present example uses a different control model 235 for each setting value SV to generate different controlling data for each setting value SV. For example, the generation unit 230 generates the map of manipulated variables, which will be described below, for each setting value SV. Moreover, the generation unit 230 may generate different controlling data for each of the plurality of systems when the control model 235 is generated corresponding to the plurality of systems.

The supply unit 240 supplies the controlling data to the control apparatus 100. Moreover, the supply unit 240 may supply the controlling data to a predetermined storing unit for storage. The supply unit 240 of the present example can supply optimal controlling data for each setting value SV or each system. Moreover, the supply unit 240 may supply optimal controlling data depending on the combination of the setting value SV and the system. Thus, the controlling data may be different for each system and may be different for each setting value in each system.

Figure 2B:
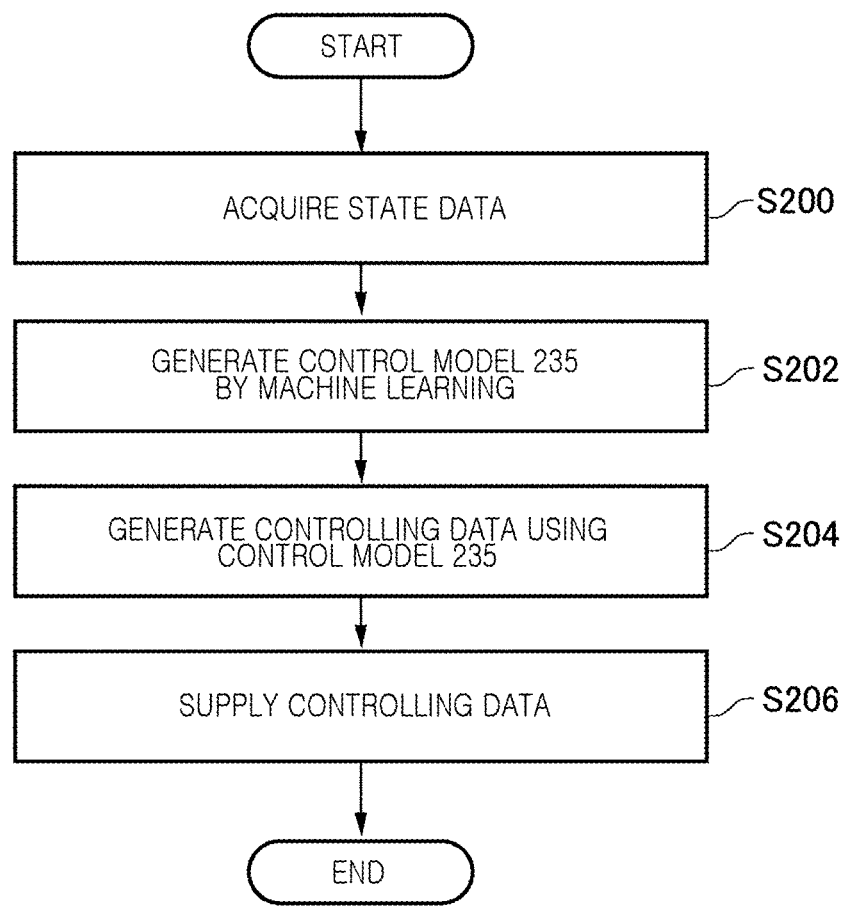
FIG. 2B illustrates an exemplary flow of machine learning by the learning processing apparatus 200.

FIG. 2B illustrates an exemplary flow of machine learning by the learning processing apparatus 200. At Step S200, the learning processing apparatus 200 acquires the state data. At Step S202, the learning processing apparatus 200 generates the control model 235 by machine learning. At Step S204, the learning processing apparatus 200 generates the controlling data using the control model 235. At Step S206, the learning processing apparatus 200 supplies the controlling data.

Figure 3:
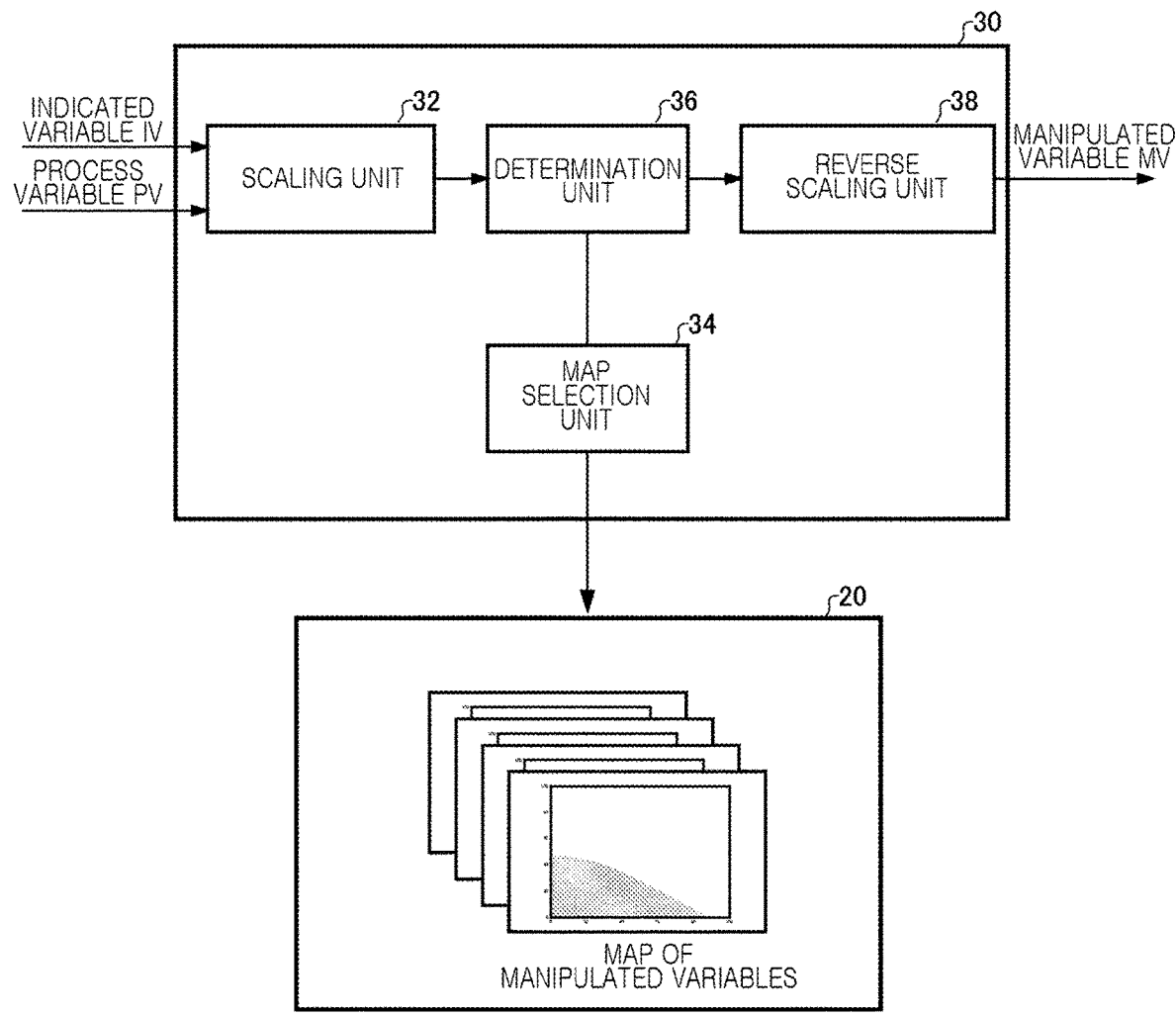
FIG. 3 illustrates an example of a more specific configuration of a calculation unit 30.

FIG. 3 illustrates an example of a more specific configuration of the calculation unit 30. The calculation unit 30 of the present example comprises a scaling unit 32, a map selection unit 34, a determination unit 36, and a reverse scaling unit 38.

The controlling data acquisition unit 20 acquires the plurality of maps of manipulated variables, as the controlling data, to which the correspondence relation of the combination of the indicated variable IV and the process variable PV to the manipulated variable MV corresponding to that combination is mapped. The plurality of maps of manipulated variables may include a different map of manipulated variables for each setting value SV. Moreover, the plurality of maps of manipulated variables may include a different map of manipulated variables for the system serving as the controlled object 310.

The scaling unit 32 scales the indicated variable IV and the process variable PV to values depending on the map of manipulated variables. The scaling unit 32 performs linear processing to scale ranges of the indicated variable IV and the process variable PV for an indicated variable IV' and a process variable PV' to match to a range of the map of manipulated variables to meet the ranges to each other. For example, the range of the process variable PV' in the map of manipulated variables is [0, 100], while the range of the process variable PV of an actual system is [0, 1]. When a value of the input process variable PV is 0.3, the scaling unit 32 performs linear processing to make the process variable PV' to 0.3×100=30 corresponding to the range of the map of manipulated variables.

The map selection unit 34 selects a predetermined map of manipulated variables from the plurality of maps of manipulated variables stored in the controlling data acquisition unit 20. The map selection unit 34 may select an appropriate map of manipulated variables based on the indicated variable IV and the process variable PV that are input in the calculation unit 30. For example, the map selection unit 34 selects the map of manipulated variables for a system that is closest to the system of the controlled object 310 from the plurality of maps of manipulated variables.

For example, the map selection unit 34 selects the map of manipulated variables appropriate to the actual system from the plurality of maps of manipulated variables based on the feature data relating to the system. Here, the plurality of maps of manipulated variables may include a map of manipulated variables specific for each application, such as a map of manipulated variables for the heating furnace or a map of manipulated variables for water level control of a three-tank system. Moreover, the plurality of maps of manipulated variables may include a map of manipulated variables for a primary delay system, a map of manipulated variables for a secondary delay system, or the like, depending on mathematical features of the system. Thus, the map selection unit 34 may select an arbitrary map of manipulated variables from the plurality of maps of manipulated variables based on information relating to an application of the system or information relating to the mathematical features of the system as the feature data. The map selection unit 34 may select an arbitrary map of manipulated variables from the plurality of maps of manipulated variables by referring to such as the information relating to the application of the system and the information relating to the mathematical features of the system in combination. More specifically, the map selection unit 34 may select the map of manipulated variables which is closest to the information of the actual system by comparing the feature data with additional information of the plurality of maps of manipulated variables. The additional information of the plurality of maps of manipulated variables may be any information relating to the map of manipulated variables. Note that the feature data may be acquired by the input data acquisition unit 10. The feature data may be input by a user, or may be calculated based on the indicated variable IV, the process variable PV, and the like which are input into the input data acquisition unit 10.

The determination unit 36 determines the manipulated variable MV' corresponding to the input indicated variable IV' and process variable PV' using the map of manipulated variables selected by the map selection unit 34. Note that the indicated variable IV and the process variable PV may be input into the determination unit 36 as they are without being scaled.

The reverse scaling unit 38 reverse-scales the manipulated variable MV' calculated from the map of manipulated variables depending on the system. The reverse scaling unit 38 performs an inverse operation on the scaling unit 32 corresponding to a range of output of the actual system and outputs the result. For example, the range of the manipulated variable MV' in the map of manipulated variables is [0, 100], while the range of the manipulated variable MV of the actual system is [0, 1]. When a value of the manipulated variable MV' obtained from the map of manipulated variables is 5, the reverse scaling unit 38 performs linear processing to make the manipulated variable MV to 5/100=0.05 corresponding to the range of output of the actual system.

Figure 4A:
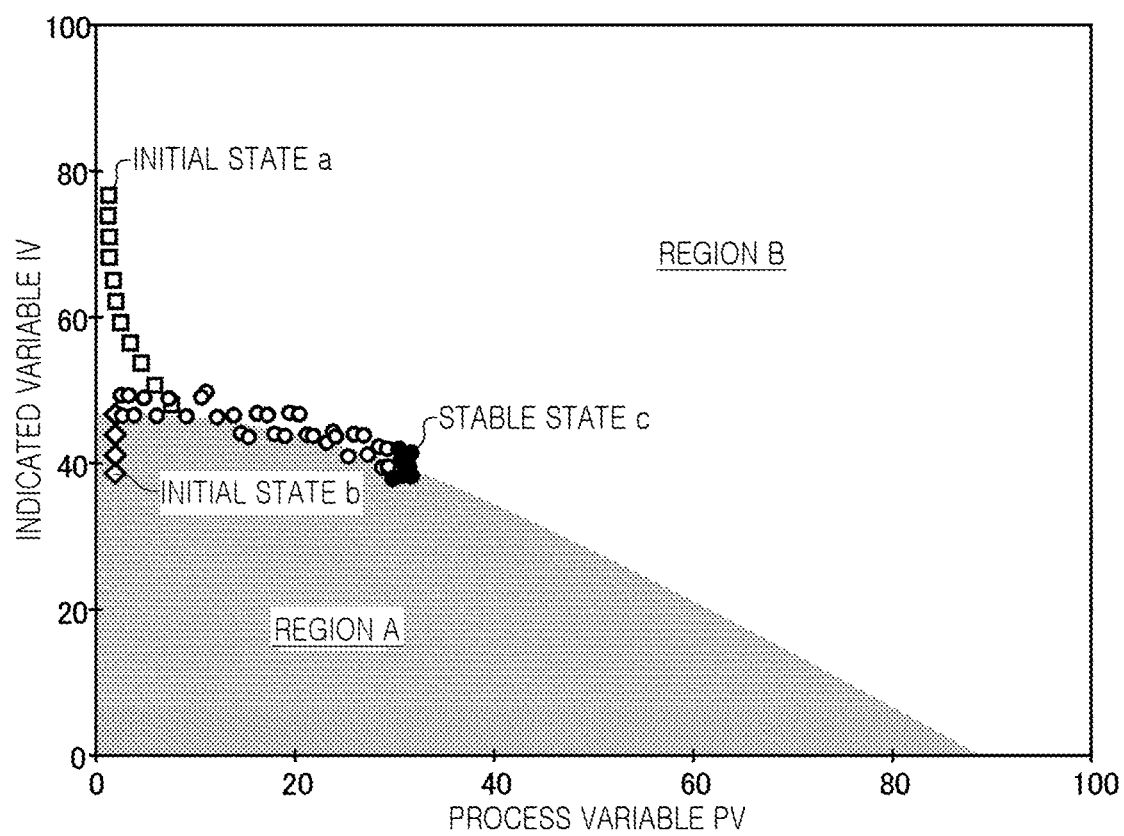
FIG. 4A illustrates an exemplary map of manipulated variables.

FIG. 4A illustrates an exemplary map of manipulated variables. The abscissa denotes the process variable PV and the ordinate denotes the indicated variable IV. Moreover, the map of manipulated variables of the present example is divided into a region A and a region B depending on the combination of the indicated variable IV and the process variable PV. The control apparatus 100 may output different manipulated variables MV for the region A and the region B.

For example, when the combination of the indicated variable IV and the process variable PV is located in the region A, the control apparatus 100 controls the controlled object 310 with the maximum manipulated variable MV within the predetermined manipulable range. Moreover, when the combination of the indicated variable IV and the process variable PV is located in the region B, the control apparatus 100 may control the controlled object 310 with the minimum manipulated variable MV within the predetermined manipulable range.

In the present example, a trajectory is shown when the system is stabilized actually by full acceleration and full braking control. For example, by performing the full braking control from a predetermined initial state a based on the map of manipulated variables, the system is finally stabilized in a stable state c. Similarly, by performing the full acceleration control from a predetermined initial state b, the system is stabilized in the same stable state c.

Figure 4B:
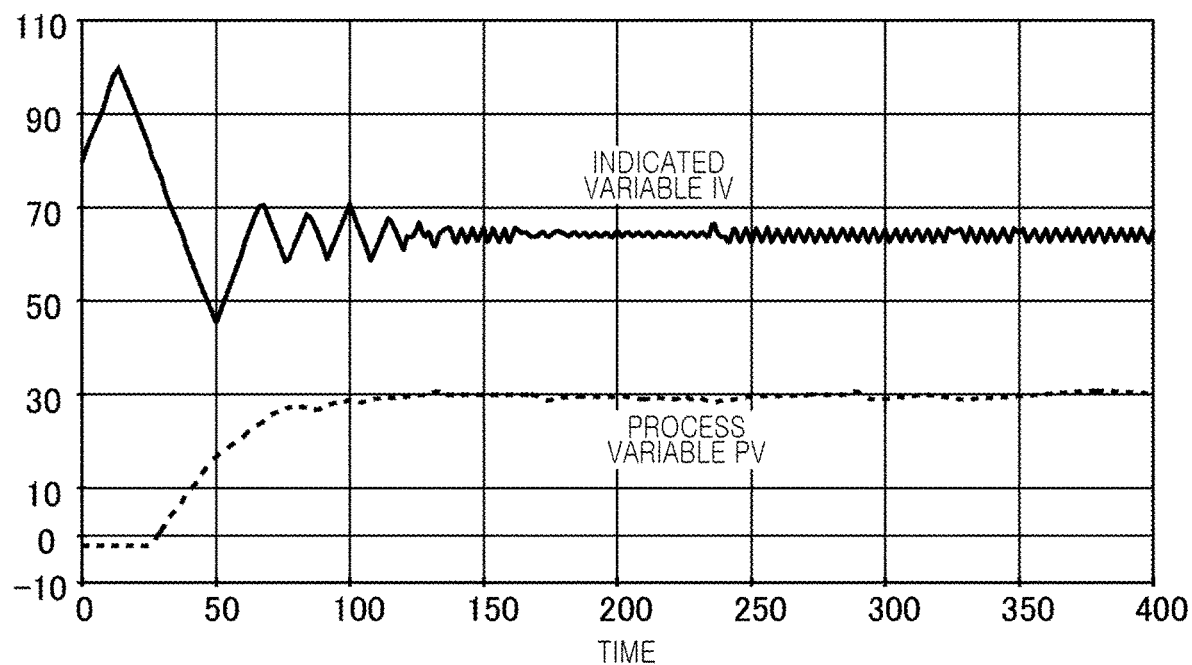
FIG. 4B illustrates an exemplary control method by the control apparatus 100 according to an example.
Figure 5:
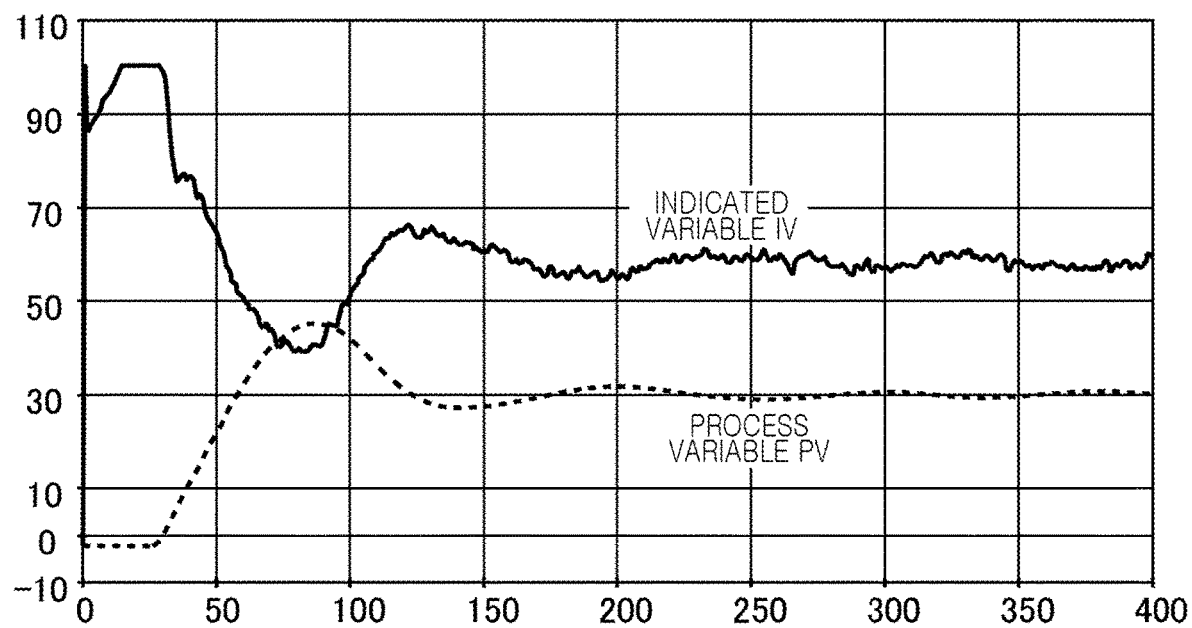
FIG. 5 illustrates an exemplary control method according to a comparative example.

FIG. 4B illustrates an exemplary control method by the control apparatus 100 according to an example In the present example, a result of control is shown when a water level is controlled for a primary delay system called a "three-tank system" on a simulator. In the present example, the full acceleration and full braking control converges a value to a predetermined setting value SV more rapidly than the PID control as shown in FIG. 5. In this manner, the control apparatus 100 of the present example sets up the appropriate manipulated variable MV using the control data, allowing to avoid overshoot and realize the high-speed control.

Figure 4C:
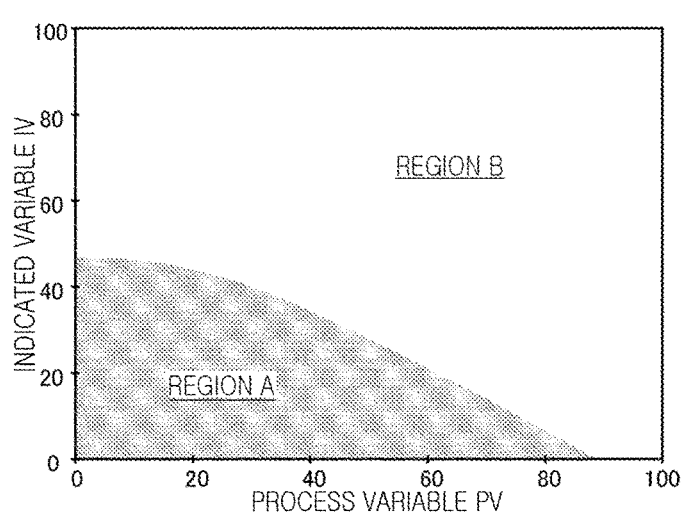
FIG. 4C illustrates an exemplary method of generating the map of manipulated variables using machine learning.

FIG. 4C illustrates an exemplary method of generating the map of manipulated variables using machine learning. The map of manipulated variables may be generated using a predetermined reinforcement learning algorithm. Although the map of manipulated variables of the present example is generated using the Kernel Dynamic Policy Programming (Kernel Dynamic Policy Programming, KDPP), it is not limited thereto.

An evaluation function uses a function f(t)=|Process Variable PV(t)−Setting Value SV| or the like, for example. The manipulated variable MV takes some points from −MAX to +MAX to make them the output values of reinforcement learning. In the KDPP, by performing sufficient learning in an one input one output system, a reinforcement learning model finally converges to a model using only two values, +MAX and −MAX. In addition, by providing the combinations of the indicated variables IV and the process variables PV to the generated reinforcement learning model and calculating the manipulated variable MV (+MAX or −MAX) to make a graph, the map of manipulated variables is generated.

FIG. 5 illustrates an exemplary control method according to a comparative example. The present example uses the PID control as a control algorithm for a single-input and single-output with one manipulated variable MV and one process variable PV.

Here, while the PID control can realize a stable control, its time to reach the setting value SV is not optimal. The PID control is a solution calculated by the Laplace transformation of a differential equation of the system to transform it into an algebraic equation, wherein as a general form, a solution space is formed by smooth functions such as a combination of exponential functions or trigonometric functions. However, the Laplace transformation of a single triangle wave leaves a term of the exponential function and does not make the algebraic equation, so that the solution such as a single triangle wave is excluded.

In contrast, the control using the full acceleration and full braking is a sum of solutions of a single triangle wave, which is not considered in the conventionally used Laplace transformation. That is, the technique using the Laplace transformation cannot calculate a solution of highest speed control using the full acceleration and full braking. Therefore, in the PID control of the comparative example, it is difficult to perform the high-speed control due to occurrence of overshoot.

Note that although it can also be considered to realize the control approximate to the full acceleration and full braking by advanced control or the like, it requires complex parameter adjustments and is thus difficult to use by mounting to a compact controller operable in a microcomputer with a small throughput. The control apparatus 100 of the present example may be replaced by a configuration that performs PID calculations of a single-loop controller, and a configuration such as analog signal processing or digital signal processing may be the same as the existing one. The control apparatus 100 can be mounted to a compact controller as well.

Figure 6A:
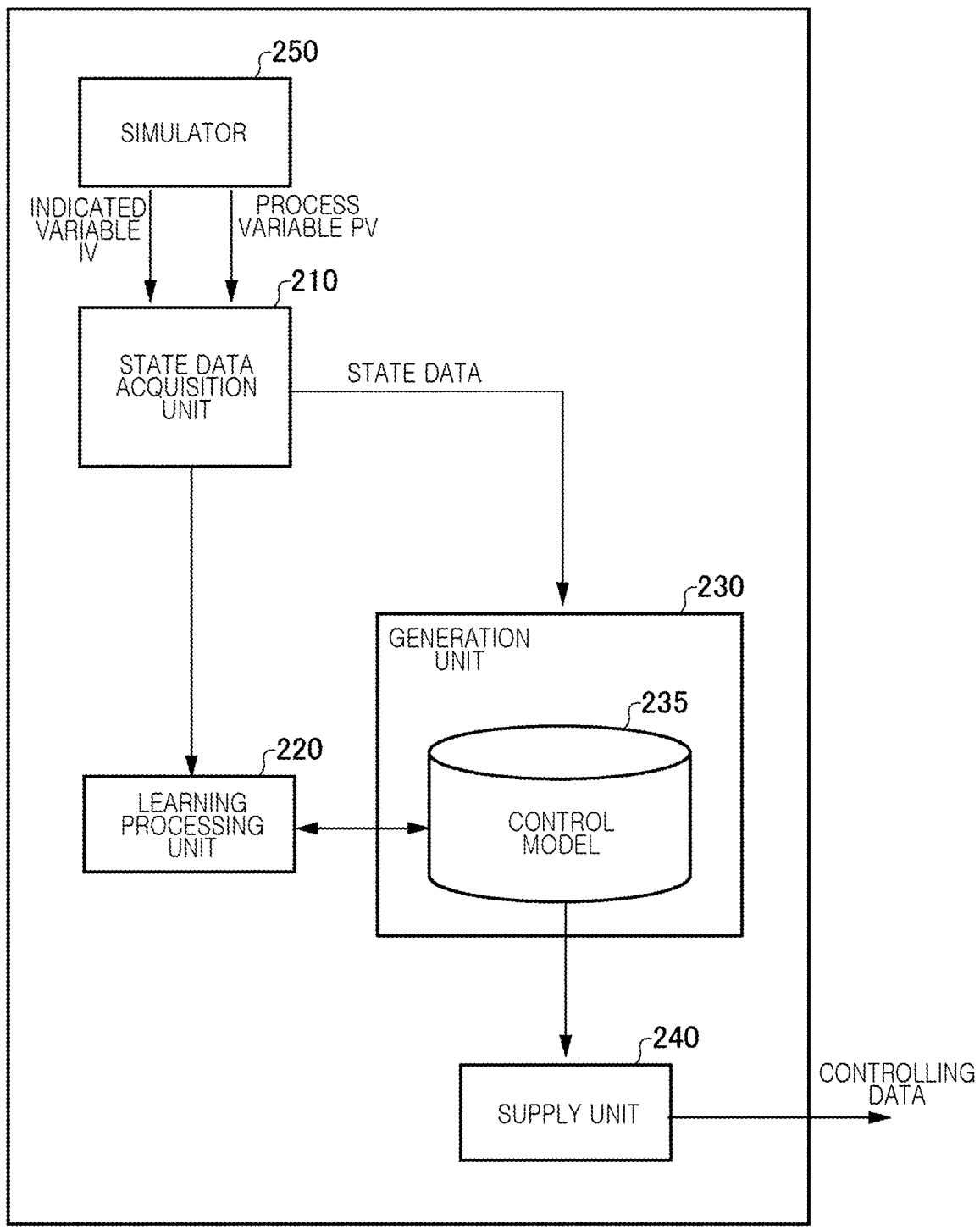
FIG. 6A illustrates an exemplary embodiment of the learning processing apparatus 200.

FIG. 6A illustrates an exemplary embodiment of the learning processing apparatus 200. The learning processing apparatus 200 comprises a simulator 250. The simulator 250 may be provided outside the learning processing apparatus 200.

The simulator 250 supplies the predetermined indicated variable IV and process variable PV to the state data acquisition unit 210. For example, the simulator 250 is created using actually measured data of the system or the like by any system identification technique. The learning processing apparatus 200 of the present example generates the control model 235 by machine learning using the simulator 250. Whereby, the learning processing apparatus 200 of the present example can realize learning processing using the simulator 250 even when the controlled object 310 is a more complex system.

Figure 6B:
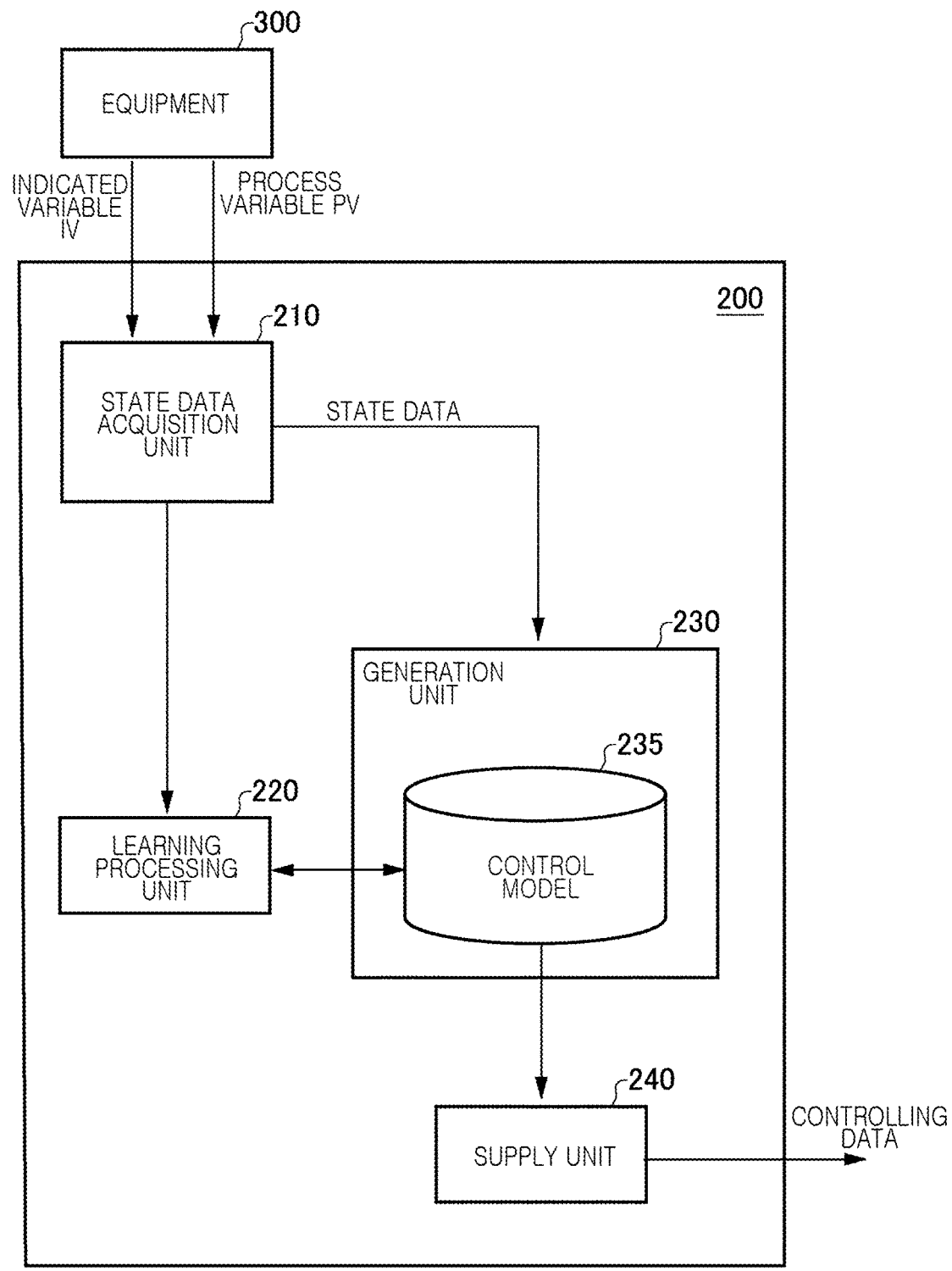
FIG. 6B illustrates an exemplary embodiment of the learning processing apparatus 200.

FIG. 6B illustrates an exemplary embodiment of the learning processing apparatus 200. The controlling data acquisition unit 20 of the present example generates the control model 235 by machine learning with the indicated variable IV and the process variable PV acquired from the equipment 300 as the state data. The learning processing apparatus 200 of the present example can generate the control model 235 even when it is difficult to generate the simulator 250 corresponding to the controlled object 310. The controlling data generated using the actual system may be used by combining it with the controlling data generated using other methods such as the simulator 250. Thus, the plurality of maps of manipulated variables may include a map of manipulated variables that is machine-learned by different methods.

Figure 7:
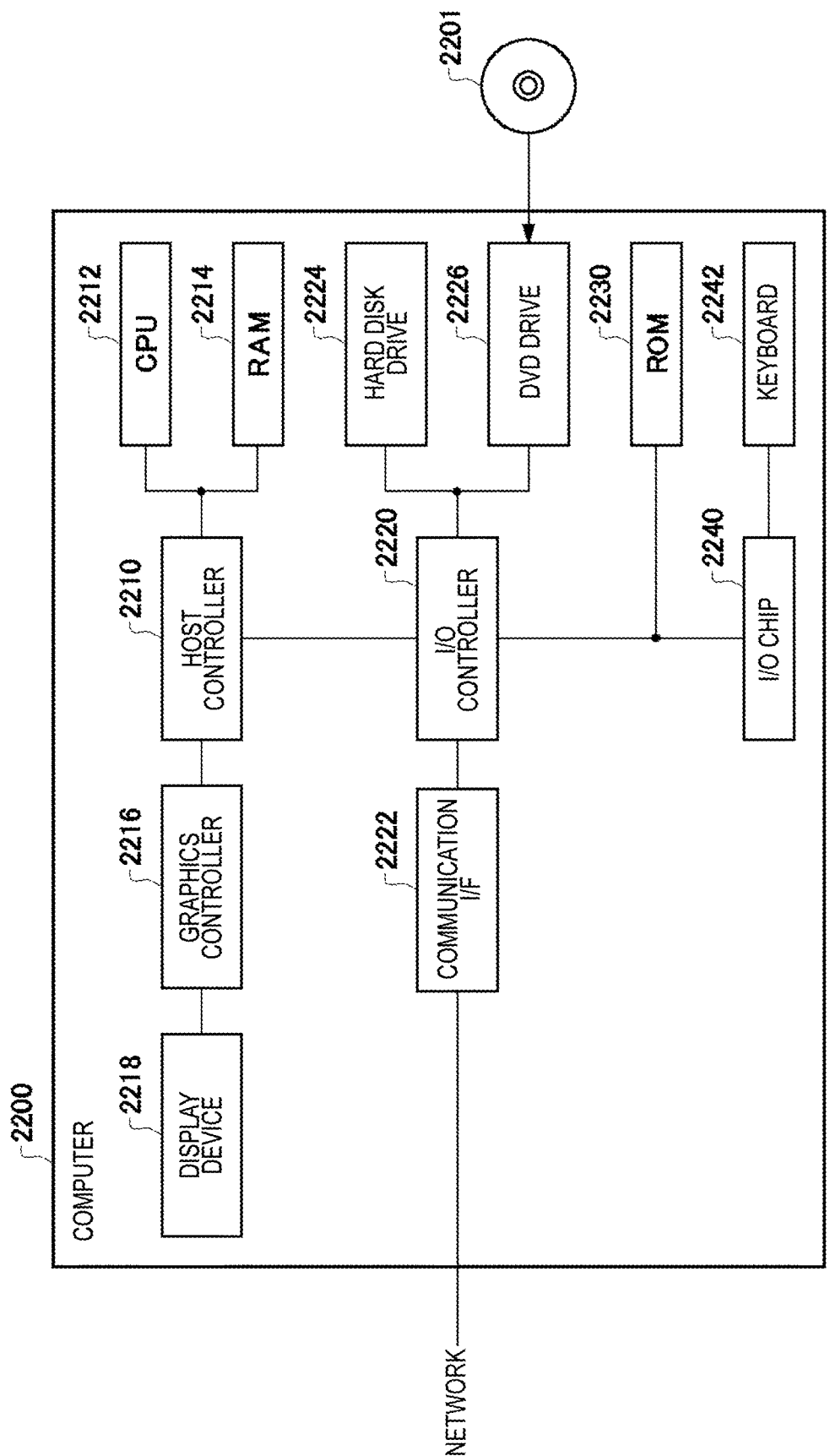
FIG. 7 illustrates an exemplary computer 2200 in which several aspects of the present invention may be wholly or partially embodied.

FIG. 7 illustrates an exemplary computer 2200 in which several aspects of the present invention may be wholly or partially embodied. A program installed in the computer 2200 can cause the computer 2200 to function as one or more sections of operations associated with the apparatus according to the embodiments of the present invention or the apparatus, or to perform the operations or the one or more sections, and/or cause the computer 2200 to perform a process or steps of the process according to the embodiments of the present invention. Such a program may be executed by a CPU 2212 to cause the computer 2200 to perform specific operations associated with some or all of the blocks in the flowchart and block diagrams described in the specification.

The computer 2200 according to the present embodiment includes the CPU 2212, a RAM 2214, a graphics controller 2216, and a display device 2218, which are connected to each other via a host controller 2210. The computer 2200 also includes a communication interface 2222, a hard disk drive 2224, a DVD-ROM drive 2226, and an I/O unit such as an IC card drive, which are connected to the host controller 2210 via an I/O controller 2220. The computer further includes a legacy I/O unit such as a ROM 2230 and a keyboard 2242, which are connected to the I/O controller 2220 via an I/O chip 2240.

The CPU 2212 operates in accordance with a program stored in the ROM 2230 and the RAM 2214, thereby controlling each unit. The graphics controller 2216 acquires image data generated by the CPU 2212 in a frame buffer or the like provided in the RAM 2214 or in the RAM 2214 itself, so that the image data is displayed on the display device 2218.

The communication interface 2222 communicates with other electronic devices via a network. The hard disk drive 2224 stores a program and data used by the CPU 2212 in the computer 2200. The DVD-ROM drive 2226 reads a program or data from a DVD-ROM 2201, and provides the program or data to the hard disk drive 2224 via the RAM 2214. The IC card drive reads the program and data from an IC card, and/or writes the program and data in the IC card.

The ROM 2230 stores therein a boot program or the like executed by the computer 2200 upon activation, and/or a program dependent on hardware of the computer 2200. The I/O chip 2240 may also connect various I/O units to the I/O controller 2220 via a parallel port, a serial port, a keyboard port, a mouse port, or the like.

A program is provided by a computer-readable medium such as the DVD-ROM 2201 or IC card. The program is read from the computer-readable medium, installed in the hard disk drive 2224, the RAM 2214, or the ROM 2230 serving also as an example of the computer-readable medium, and executed by the CPU 2212. Information processing described in these programs is read by the computer 2200 to provide a link between the program and the various types of hardware resources as mentioned above. The apparatus or method may be configured by realizing information operations or processing according to the use of the computer 2200.

For example, when performing the communication between the computer 2200 and an external device, the CPU 2212 may execute a communication program loaded in the RAM 2214 and, based on the processing described in the communication program, instruct the communication interface 2222 to perform communication processing. The communication interface 2222, under control of the CPU 2212, reads transmission data stored in a transmission buffer processing area provided in a recording medium such as the RAM 2214, the hard disk drive 2224, the DVD-ROM 2201, or the IC card, and transmits the read transmission data to a network, or otherwise writes received data from the network in a reception buffer processing area or the like provided on the recording medium.

Moreover, the CPU 2212 may allow the RAM 2214 to read all or necessary parts of a file or database stored in an external recording medium, such as the hard disk drive 2224, the DVD-ROM drive 2226 (DVD-ROM 2201), and the IC card, to perform various types of processing for the data stored on the RAM 2214. The CPU 2212 then writes back the processed data in the external recording medium.

Various types of information such as various types of programs, data, tables, and databases may be stored in the recording medium and subject to information processing. On the data read from the RAM 2214, the CPU 2212 may perform various types of processing including various types of operations, information processing, condition determination, conditional branching, unconditional branching, information retrieval/conversion, and the like, which are described anywhere in the present disclosure and specified by an instruction sequence of a program, and write back the result in the RAM 2214. The CPU 2212 may also retrieve information in a file, database, or the like in the recording medium. For example, when the recording medium stores a plurality of entries each having a first attribute value associated with a second attribute value, the CPU 2212 may retrieve an entry from the plurality of entries that matches a condition where the first attribute value is specified, read the second attribute value stored in the entry, thereby acquiring the second attribute value associated with the first attribute that satisfies a predetermined condition.

The programs or software modules described above may be stored on the computer 2200 or a computer-readable medium in the vicinity of the computer 2200. Moreover, a recording medium such as a hard disk or RAM provided in a server system connected to a dedicated communication network or the Internet is usable as the computer-readable medium, thereby providing the program to the computer 2200 via the network.

While the present invention has been described using the embodiments, the technical scope of the present invention is not limited to the scope described in the above embodiments. It is apparent to persons skilled in the art that various alterations or improvements can be added to the above-described embodiments. It is also apparent from the description of the claims that the embodiments added with such alterations or improvements can be included in the technical scope of the present invention.

It should be noted that each processing such as the operations, procedures, steps, and stages in the apparatus, system, program, and method shown in the claims, specification, and diagrams can be realized in any order unless the performance order is otherwise indicated by "before," "prior to," or the like and unless the output from a previous process is used in a later process. Even if the operational flow is described conveniently using phrases such as "first" or "next" in the claims, specification, and diagrams, it does not mean that the flow is essentially performed in this order.

EXPLANATION OF REFERENCES

10: input data acquisition unit; 20: controlling data acquisition unit; 30: calculation unit; 32: scaling unit; 34: map selection unit; 36: determination unit; 38: reverse scaling unit; 40: output unit; 50, 100: control apparatus; 200: learning processing apparatus; 210: state data acquisition unit; 220: learning processing unit; 230: generation unit; 235: control model; 240: supply unit; 250: simulator; 300: equipment; 310: controlled object; 2200: computer; 2201: DVD-ROM; 2210: host controller; 2212: CPU; 2214: RAM; 2216: graphics controller; 2218: display device; 2220: I/O controller; 2222: communication interface; 2224: hard disk drive; 2226: DVD-ROM drive; 2230: ROM; 2240: I/O chip; 2242: keyboard

What is claimed is:

1. A learning processing apparatus comprising:
at least one processor;
a learning processing unit that uses the at least one processor to generate a control model that outputs a manipulated variable corresponding to an indicated variable and a process variable of a predetermined system by means of machine learning;
a generation unit that uses the at least one processor to generate controlling data that indicates a correspondence relation of a combination of the indicated variable and the process variable to the manipulated variable corresponding to the combination by using the control model; and
a supply unit that uses the at least one processor to supply the controlling data to a predetermined control apparatus;
wherein:
the controlling data includes a map of manipulated variables to which the correspondence relation of the combination of the indicated variable and the process variable to the manipulated variable corresponding to the combination is mapped.

2. The learning processing apparatus according to claim 1, wherein:
the manipulated variable is a maximum manipulated variable or a minimum manipulated variable within a predetermined manipulable range.

3. The learning processing apparatus according to claim 2, wherein:
the control model is configured to output the manipulated variable so that the process variable is a set-up setting value; and
the generation unit uses the at least one processor to generate the controlling data that are different for each setting value.

4. The learning processing apparatus according to claim 2, wherein:
the control model is generated corresponding to a predetermined plurality of systems; and
the generation unit uses the at least one processor to generates the controlling data that are different for each of the plurality of systems.

5. The learning processing apparatus according to claim 1, wherein:
the control model is configured to output the manipulated variable so that the process variable is a set-up setting value; and
the generation unit uses the at least one processor to generate the controlling data that are different for each setting value.

6. The learning processing apparatus according to claim 5, wherein:
the control model is generated corresponding to a predetermined plurality of systems; and the generation unit uses the at least one processor to generates the controlling data that are different for each of the plurality of systems.

7. The learning processing apparatus according to claim 1, wherein:
the control model is generated corresponding to a predetermined plurality of systems; and
the generation unit uses the at least one processor to generates the controlling data that are different for each of the plurality of systems.

8. The learning processing apparatus according to claim 1, wherein:
the control apparatus comprises a map selection unit that uses the at least one processor to select an arbitrary map of manipulated variables from the plurality of maps of manipulated variables based on feature data.

9. A control apparatus comprising:
at least one processor;
an input data acquisition unit that uses the at least one processor to acquire an indicated variable and a process variable of a predetermined system;
a controlling data acquisition unit that uses the at least one processor to acquire controlling data that is generated using a control model which has been made to learn to output a manipulated variable corresponding to the indicated variable and the process variable and that indicates a correspondence relation of a combination of the indicated variable and the process variable to the manipulated variable which is output corresponding to the combination;
a calculation unit that uses the at least one processor to calculate the manipulated variable corresponding to the combination of the indicated variable and the process variable using the controlling data; and
an output unit that uses the at least one processor to output the manipulated variable to a predetermined controlled object;
wherein:
the controlling data acquisition unit uses the at least one processor to acquire a plurality of maps of manipulated variables, as the controlling data, to which the correspondence relation of the combination of the indicated variable and the process variable to the manipulated variable corresponding to the combination is mapped;
the input data acquisition unit uses the at least one processor to acquire feature data relating to the system; and
the control apparatus comprises a map selection unit uses the at least one processor to select an arbitrary map of manipulated variables from the plurality of maps of manipulated variables based on the feature data.

10. The control apparatus according to claim 9, comprising:
a scaling unit that uses the at least one processor to scale the indicated variable and the process variable to values depending on the map of manipulated variables; and
a reverse scaling unit that uses the at least one processor to reverse-scale the manipulated variable calculated from the map of manipulated variables depending on the system.

11. The control apparatus according to claim 9, wherein:
the output unit uses the at least one processor to outputs a maximum manipulated variable or a minimum manipulated variable within a predetermined manipulable range as the manipulated variable to the controlled object.

12. The control apparatus according to claim 9, wherein:
the output unit uses the at least one processor to outputs a maximum manipulated variable or a minimum manipulated variable within a predetermined manipulable range as the manipulated variable to the controlled object.

13. A learning processing method comprising:
generating a control model that outputs a manipulated variable corresponding to an indicated variable and a process variable of a predetermined system by means of machine learning;
generating controlling data that indicates a correspondence relation of a combination of the indicated variable and the process variable to the manipulated variable corresponding to the combination by using the control model; and
supplying the controlling data to a predetermined control apparatus;
wherein:
the controlling data includes a map of manipulated variables to which the correspondence relation of the combination of the indicated variable and the process variable to the manipulated variable corresponding to the combination is mapped.

14. A control method comprising:
acquiring an indicated variable and a process variable of a predetermined system;
acquiring controlling data that is generated using a control model which has been made to learn to output a manipulated variable corresponding to the indicated variable and the process variable and that indicates a correspondence relation of a combination of the indicated variable and the process variable to the manipulated variable which is output corresponding to the combination;
calculating the manipulated variable corresponding to the combination of the indicated variable and the process variable by using the controlling data; and
outputting the manipulated variable to a predetermined controlled object;
wherein:
the controlling data includes a map of manipulated variables to which the correspondence relation of the combination of the indicated variable and the process variable to the manipulated variable corresponding to the combination is mapped.

15. A non-transitory computer-readable medium having recorded thereon a learning program
executed by a computer to cause the computer having at least on processor to function as
a learning processing unit that uses the at least one processor to generate a control model that outputs a manipulated variable corresponding to an indicated variable and a process variable of a predetermined system by means of machine learning;
a generation unit that uses the at least one processor to generate controlling data that indicates a correspondence relation of a combination of the indicated variable and the process variable to the manipulated variable corresponding to the combination by using the control model; and
a supply unit that uses the at least one processor to supply the controlling data to a predetermined control apparatus;
wherein:
the controlling data includes a map of manipulated variables to which the correspondence relation of the combination of the indicated variable and the process variable to the manipulated variable corresponding to the combination is mapped.

16. A non-transitory computer-readable medium having recorded thereon a control program
executed by a computer having at least one processor to cause the computer to function as
an input data acquisition unit that uses the at least one processor to acquire an indicated variable and a process variable of a predetermined system;
a controlling data acquisition unit that uses the at least one processor to acquire controlling data that is generated using a control model which has been made to learn to output a manipulated variable corresponding to the indicated variable and the process variable and that indicates a correspondence relation of a combination of the indicated variable and the process variable to the manipulated variable which is output corresponding to the combination;
a calculation unit that uses the at least one processor to calculate the manipulated variable corresponding to the combination of the indicated variable and the process variable by using the controlling data; and
an output unit that uses the at least one processor to output the manipulated variable to a predetermined controlled object;
wherein:
the controlling data includes a map of manipulated variables to which the correspondence relation of the combination of the indicated variable and the process variable to the manipulated variable corresponding to the combination is mapped.

* * * * *